May 12, 1931.   C. H. ZIERDT   1,804,664
POWER SUPPLY SYSTEM
Filed Oct. 1, 1930
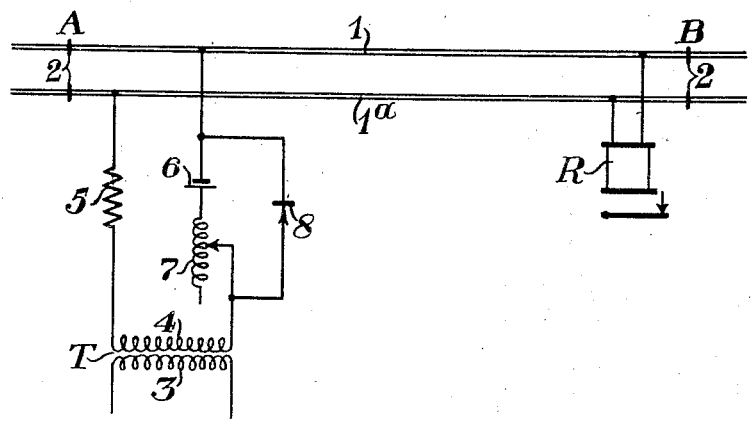
INVENTOR:
C. H. Zierdt,
BY
His ATTORNEY Patented May 12, 1931

1,804,664

UNITED STATES PATENT OFFICE

CONRAD H. ZIERDT, OF ROSEDALE, PENN TOWNSHIP, ALLEGHENY COUNTY, PENNSYLVANIA, ASSIGNOR TO THE UNION SWITCH & SIGNAL COMPANY, OF SWISSVALE, PENNSYLVANIA, A CORPORATION OF PENNSYLVANIA

POWER SUPPLY SYSTEM

Application filed October 1, 1930. Serial No. 485,703.

My invention relates to power supply systems, and particularly to systems of the type involving a direct current load, a source of alternating current and a rectifier for normally furnishing power to such load, and a battery charged from such source for furnishing power to the load when the source of alternating current fails.

One feature of my invention is the provision, in systems of this character, of novel and improved means for varying the direct current supplied to the battery in proportion to the alternating component of the current supplied to the load, thereby minimizing the amount of power which must be furnished by the battery, and so prolonging to the maximum extent the life of the battery.

I will describe one form of system embodying my invention, and will then point out the novel features thereof in claims.

The accompanying drawing is a diagrammatic view showing one form of power supply system embodying my invention.

Referring to the drawing, the load, in the form here shown, is a railway track circuit. The reference characters 1 and 1ª designate the rails of a railway track, which rails are divided by insulated joints 2 to form a track section A—B. A direct current track relay R is connected across the rails at one end of the section, whereas, a power supplying system embodying my invention is connected across the rails at the other end of the section. This system involves a transformer T, the primary 3 of which is constantly supplied with alternating current from a source which is not shown in the drawing. One terminal of the secondary 4 of transformer T is connected with one of the track rails 1ª through a current-limiting resistance 5. The other terminal of the secondary 4 is connected with the rail 1 through a variable reactor 7 and a battery 6. A rectifier or asymmetric unit 8 is connected in multiple with the reactor 7 and battery 6, and is poled to prevent the flow of current from the battery through the rectifier.

When the right-hand terminal of secondary 4 is positive, the greater part of the current from this secondary will flow through the rectifier 8 to the track circuit, and the remainder of this current will flow through the reactor 7 and battery 6 in such direction as to tend to discharge the battery. The adjustment of the reactor controls the division of current between the two branches of the circuit. When the left-hand terminal of secondary 4 is positive, the secondary current is opposed by the rectifier 8, and, consequently, all of the secondary current will flow through the battery 6 in such direction as to charge the battery. This current, flowing in the reactor 7, delivers energy to the magnetic field of the reactor, which energy is available during the next half wave to flow through rectifier 8 and battery 6 and so still further increase the charge delivered to the battery. The result is that during one-half of each wave of the alternating current, a current is applied to the battery 6 in such direction as to tend to charge the battery.

When the battery 6 is of the primary type, the reactor 7 is so adjusted that under normal conditions the current taken out of the battery during the first half of the cycle is substantially equal to the current charged into the battery during the second half-cycle, so that little or no net charging current flows through the battery. In the event of failure of the source of alternating current, the battery will automatically furnish direct current to the load.

When the battery 6 is of the secondary or storage type, the reactor 7 is so adjusted that under normal conditions a small net charging current will be supplied to the battery to maintain the battery in the fully charged condition. When the source of alternating current fails, the battery will, of course, automatically supply direct current to the load.

One advantage of my invention is the fact that the direct current output of the rectifier automatically varies in proportion to the direct current flowing to the load, and that this variation is accomplished by the alternating component of the current supplied to the load. This makes it possible to furnish practically all the direct current by the transformer and rectifier over a wide range of variations in the load, thereby resulting in the minimum consumption of energy from the battery 6. It follows that when the battery is of the primary type, its life may be prolonged to the maximum extent. When the battery is of the storage type, the possibility of over-charging or under-charging, due to fluctuating demands of the load, is greatly reduced, thereby eliminating the necessity for frequent readjustment of the charging rate.

Although I have herein shown and described only one form of power supply system embodying my invention, it is understood that various changes and modifications may be made therein within the scope of the appended claims without departing from the spirit and scope of my invention.

Having thus described my invention, what I claim is:

1. In combination, a source of alternating current, a load connected therewith, a battery and a reactor connected in series between one terminal of said source and said load, and a rectifier connected in multiple with said battery and said reactor and poled to prevent the flow of current from said battery through the rectifier.

2. In combination, a section of railway track, a source of alternating current connected across the rails of said section, a rectifier and a reactor connected in series between said source and one track rail, a rectifier connected in multiple with said battery and said reactor and poled to prevent the flow of current from the battery through the rectifier, and a direct current relay connected with the rails of said section.

In testimony whereof I affix my signature.

CONRAD H. ZIERDT.